United States Patent [19]

Kaufman

[11] 3,914,597

[45] Oct. 21, 1975

[54] SYSTEM FOR ADJUSTING INDIVIDUAL SENSORS IN AN ARRAY

[75] Inventor: Irving Kaufman, Tempe, Ariz.

[73] Assignee: The United States of America as represented by the Secretary of the Air Force, Washington, D.C.

[22] Filed: July 12, 1974

[21] Appl. No.: 488,129

[52] U.S. Cl. .............. 250/204; 250/229; 250/209; 340/173.2; 340/173 LM
[51] Int. Cl.² ......................................... G01J 21/32
[58] Field of Search .......... 250/553, 204, 226, 205, 250/211 J, 225, 229, 209; 350/150; 340/173 LS, 173 LM, 173.2, 173 CL

[56] References Cited
UNITED STATES PATENTS

| | | | |
|---|---|---|---|
| 2,936,380 | 5/1960 | Anderson | 250/225 |
| 3,083,262 | 3/1963 | Hanlet | 340/173.2 |
| 3,702,724 | 11/1972 | Land et al. | 340/173.2 X |
| 3,721,963 | 3/1973 | Jenne | 250/205 X |
| 3,729,634 | 4/1973 | Jensen et al. | 250/204 |

Primary Examiner—Walter Stolwein
Attorney, Agent, or Firm—Joseph E. Rusz; Julian L. Siegel

[57] ABSTRACT

A system for adjusting the sensitivity of an array of sensors. A plate of ferroelectric material that is divided into elements by a multiplicity of transparent electrodes is positioned adjacent to the sensor array to permit light to transmit through the elements to corresponding sensors. The ferroelectric elements and the sensors are each connected to a shift registers. The output of the sensor array taken from its shift register is fed to a comparator which is also fed by a reference level source. The comparator then feeds the corresponding element in the ferroelectric plate through its shift register.

5 Claims, 6 Drawing Figures

SYSTEM FOR ADJUSTING INDIVIDUAL SENSORS IN AN ARRAY

BACKGROUND OF THE INVENTION

This invention relates to sensor arrays, and more particularly to a system for equalizing the sensitivities of a multiplicity of sensing elements in an array.

A problem that exists in sensor arrays is that while each element of the array senses the illumination impinging upon it and converts it to an electrical signal, such as voltage level, the response of the many different elements may vary because their sensitivities are not identical. Moreover, the sensitivity may change with age. There is a need in the art for a convenient method of equalizing the sensitivity of the various elements on a large scale. The present invention provides this need by using a calibration technique operable on a great multitude of elements.

SUMMARY OF THE INVENTION

Equalizing the effective sensitivities of an an array of sensor elements is obtained by placing a plate of PLZT (a composition of lead, lanthanum, zirconium and titanate) between the array and the source of light. The PLZT plate is segmented into a multiplicity of elements by transparent electrodes and each of the elements corresponds to one of the sensors in the array. The PLZT elements and the array sensors are connected each to shift registers pulsed by a clock. The output of the sensor array as taken from its shift register is compared to a standard level and the difference is fed back through a shift register to the elements of the PLZT which controls the light transmission either by birefringence or scattering.

It is therefore an object of this invention to provide a method and system of equalizing the sensitivities in an array of photosensors.

It is another object to provide a method and system of equalizing the sensitivities of an integrated array of sensors having a great multiplicity of elements.

It is still another object to provide a system of adjusting sensitivities of sensor arrays for the ultraviolet, visible, and infrared regions of the light spectrum.

These and other objects, advantages and features of the invention will become more apparent from the following description taken in conjunction with the illustrated embodiment of the accompanying drawings.

DETAILED DESCRIPTION OF THE PREFERRED EMBODIMENT

Figure 1:
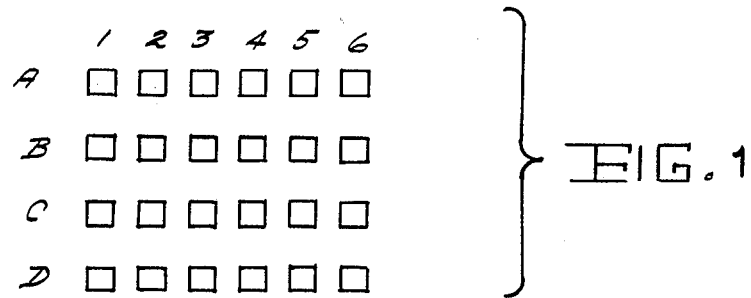
FIG. 1 shows an array of photosensitive elements required to have their sensitivities equalized.

Referring to FIG. 1, there is shown a 6 × 4 array of elements that are to sense light impinging upon it. Each element has the function of producing an output from impinging light. This illumination could be broad band, i.e., ranging anywhere from ultraviolet through infrared, or it could be narrow band and encompass, as an example, only the narrow portion of the infrared spectrum. The response to this illumination could be photoconducting, photovoltaic, or any other type. Ultimately, this response is usually converted into an electrical signal, such as a voltage level.

Figure 2:
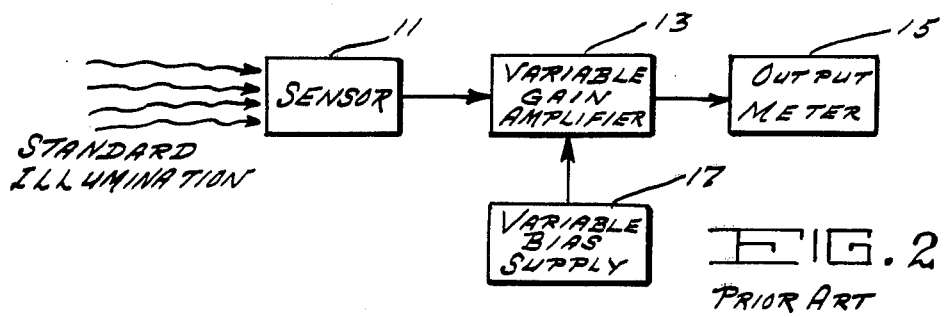
FIG. 2 is a block diagram showing a prior art technique for equalizing the sensitivities of photosensors.

Since the array of sensors have different sensitivities and these sensitivities may change with age, it is desirable to have a technique to equalize the sensitivities. For an array that has only a few elements (as an example, in the order of 10–100), one method of equalizing their response is shown in FIG. 2. A light source providing standard illumination of the intensity that is in the range of interest is used to illuminate each sensor element 11, one at a time, with this constant intensity light source. For each element variable gain amplifier 13 is adjusted to generate a constant output. The output, which in this case is a voltage, is measured with meter 15 as sensor 11 is illuminated with the standard level of illumination. The output of bias supply 17 is then varied, thereby varying the gain of variable gain amplifier 13 until the output level has reached a standard value. This standardization procedure is repeated for each of the sensor elements.

While this technique is satisfactory for an array of discrete elements that are relatively few in number, it is not satisfactory for an integrated array of a great multitude of sensitive elements, for example, one hundred thousand elements.

The present invention utilizes a transparent material whose effective transmission can vary by an applied voltage and, moreover, has a memory. This material is known as PLZT, which is a composition of lead, lanthanum, zirconium and titanate. It is a transparent ferroelectric ceramic developed by the Sandia Corporation, and is commercially available. This ceramic material has been found to have at least two distinct properties, either one of which could be used in the invention.

The first property is exhibited by fine-grained PLZT which has a birefringence whose extent is controlled by the polarization (electric dipole moment per unit volume) of the material. At a particular time the direction and magnitude of this polarization is determined by the past history of the material and principally by electric fields that were applied to the material at some prior time.

Figure 3A:
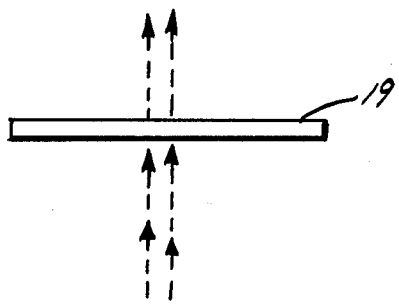
FIGS. 3a and 3b are diagrams showing the light scattering effect by coarse grained PLZT.
Figure 3B:
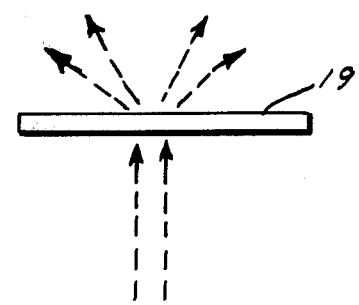

The second property is exhibited by coarse-grained PLZT which has a scattering pattern of radiation whose direction is controlled by the polarization. Thus, the material polarization is used to control the effective amount of transmitted light. In the case of coarse-grained PLZT, for one magnitude and direction of polarization, as shown in FIG. 3a, light that is transmitted through PLZT material 19 is essentially scattered forward. For another magnitude and direction of polarization, as shown in FIG. 3b, the light is scattered to the side or at a large angle. Thus, by using a small iris for each element, the amount of light transmitted through the iris is controlled by the polarization of the material.

Figure 4:
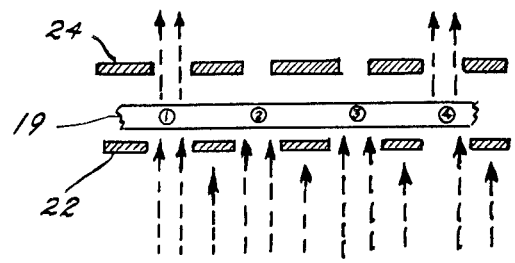
FIG. 4 is a diagram showing the effective control of transmitted light by material polarization.

As shown in FIG. 4, four areas of the PLZT plate define four elements. The polarization pattern is for maximum transmission through elements No. 1 and No. 4, and zero transmission through No. 2 and No. 3. Two irises are used, entrance iris 22 and exit iris 24.

For the material whose birefringence is controlled by the material polarization in the fine-grained case, the transmission can be controlled in the following manner.

The light is first filtered so that only one type of electric-field polarization is allowed to enter the system, such as vertical polarization of the E-field. At the output the polarizer is positioned to permit only light to pass out whose E-field is orthogonal to the entry of the E-field. For certain combinations of birefringence and pattern length, the light is allowed to pass through the output polarizer and can vary from zero to the entire light. The birefringence of the PLZT material depends upon the polarization. Consequently, by controlling this material polarization, it is possible to control the light permitted to pass.

While ferroelectrics have been used to control light in this manner (using birefringence) for many years, the great feature of a material such as PLZT is that a pattern of material polarization over an extended area of a plate may be stored by proper manipulation of the past history of applied electric fields, with great detail in the pattern. Consequently, the information that is essentially the pattern of a picture can be stored in the PLZT plate. This picture can then be reproduced by proper illumination and polarizing filters for the fine-grained materials, or by illumination (with somewhat less detail) for the coarse-grained material. Meitzler of Bell Telephone Laboratories has stored such a material polarization pattern in a ferroelectric transparent ceramic plate for greater than a year and reproduced the picture that corresponds to this pattern by proper illumination and filtering.

Figure 5:
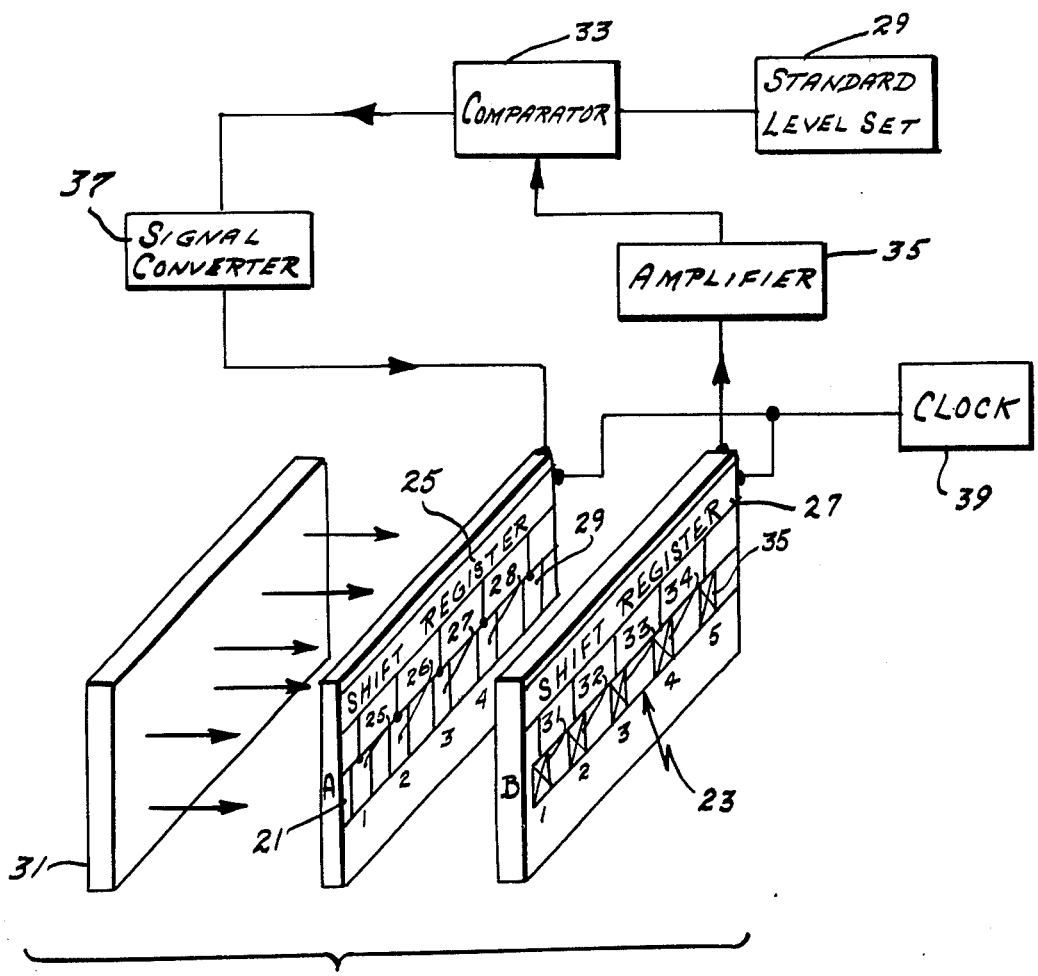
FIG. 5 is a schematic diagram showing an embodiment of the invention.

The PLZT plate is used to equalize the outputs of the various sensors of a sensor array, as shown in FIG. 5, which illustrates a one-dimensional display. The principle is readily extended to two-dimensional displays. A strip of a material 21 such as the PLZT is placed immediately in front of a sensor array 23. The system can be enhanced by affixing spots of photoconductive material on the strip. Transparent segmented contacts or electrodes 25–29 and 31–35 are applied to both PLZT strip 21 in plate A and the sensor array 23 in plate B so PLZT plate A and the sensor array plate B are divided into a number of elements, where each element has an electrode connected to it. The elements in plate A are designated as $A_1$, $A_2$, ... and the corresponding ones in B as $B_1$, $B_2$, ... By proper positioning and patterning, element $An$ is placed immediately in front of element $Bn$. All elements in the A-plate are connected to shift register 25; all elements in the B-plate are connected to shift register 27. During calibration, i.e., during sensitivity equalization, these shift registers are arranged so that when element An is connected to the common input of register 25, element Bn is connected to the common input of register 27. To equalize the sensitivities of the various elements, a choice of the standardized output level from source 29 is made corresponding to the level of illumination used to perform the standardization, or equalization. If all the sensors are of nearly equal sensitiviy, this standard output level would be the output of the least sensitive of the elements.

The equalization consists of illuminating the sensor array 21 with constant intensity illumination from source 31 and scanning the sensor array in plate B. As any one element, $Bn$, is scanned, the output level of the element is compared to the "standard" level that was previously set. This is performed by feeding the output of shift register 27 to comparator 33 via amplifier 35. The amplitude of the difference between the output level of that element and the standard level is then used to control the amplitude of a voltage pulse, or pulses, applied across the electrodes of element $An$ of the PLZT by feeding the output of comparator 33 to signal converter 37 and then to shift register 25. This sets the material polarization in amplitude and direction so that the effective transmission through element $An$ becomes such that the signal level out of sensor element $Bn$ becomes the standard level. This transmission control could occur by using either the scattering mode or birefringent mode.

After the setting of the polarizations of all the elements has been completed, the effective sensitivity of the elements will have been equalized, at least for one level of illumination. The circuit is then switched so that no comparison to any standard level is made, i.e., the electrical connection to the PLZT is removed. The output sensor array can then be used as a scanned sensor array, as intended, with the assurance that in the vicinity of a chosen level of illumination the sensitivities of the various elements are approximately equal. When using the scattering mode of coarse-grained PLZT irises as that shown in FIG. 4 would be placed on both sides of the PLZT plate. When using the birefringence mode of fine-grained PLZT, a polarizer (not shown) would be placed between plate A and plate B.

The shift registers described can be simply single-pole, n-throw switches. That is, they connect a single input to any one of $n$ outputs, either a control pulse to an element of the PLZT plate A or an element of the sensor array plate B to the output amplifier 35.

These devices are common off-the-shelf devices, usually solid state electronics (Motorola, Texas Instruments), but can also be a fluidic device (Corning). Selection of the desired output could be manual for low-speed applications, but is often automatic or sequential with the switch rate determined by a clock pulse from clock 39. For two-dimensional arrays using $x$-$y$ coincident addressing, two shift registers per array are required, one to select row $x_j$ and the other to select column $y_k$ whenever the $j$-$k^{th}$ element is to be addressed.

In this application, the shift register 25 and 37 are synchronized so that when sensor element $Bn$ is connected to the output, control element $An$ is connected to the level-control voltage.

The equalization procedure, which is seen to be nearly automatic and can therefore be applied to arrays having many elements, for example, $10^5$, can be repeated whenever the sensitivities of the elements become suspect.

The setting of the polarizations of all the PLZT elements equal before the equalization is carried out can be obtained by a standard depolarizing procedure (similar to the demagnetization of watches by an AC field) or by application of strong pulses to drive all elements to their remanent polarization values. It is necessary to determine whether this remanent polarization should be in the plane of the PLZT in perpendicular to it, and whether another electrode (per element) is required.

In addition to the equalization of the sensitivities of the elements of a sensor array, the procedure could also be applied to a display array in which the individual elements have different luminance for the same power input.

What is claimed is:

1. A system for adjusting the effective sensitivities of a multiplicity of sensors in an array comprising:

a. a first shift register having a multiplicity of stages, one each being fed to one of the multiplicity of sensors in the array;
b. a light source directed at the array of sensors;
c. a plate of transparent ferroelectric material interposed between a source of light and the array of sensors;
d. a second shift register having a multiplicity of stages;
e. a multiplicity of transparent electrical contacts affixed to the plate of ferroelectric material with each of the contacts fed by one of the stages of the second shift register, the contacts dividing the ferroelectric material into a multiplicity of elements corresponding with the multiplicity of sensors;
f. a level reference source; and
g. a comparator fed by the level reference source and the common output of the first shift register with the output of the converter being fed to the common input of the second shift register.

2. A system for adjusting the effective sensitivities of a multiplicity of sensors according to claim 1 wherein the ferroelectric material is a composition of lead, lanthanum, zirconium and titanate.

3. A system for adjusting the effective sensitivities of a multiplicity of sensors according to claim 2 which further comprises a signal converter interposed between the comparator and the second shift register.

4. A system for adjusting the effective sensitivities of a multiplicity of sensors according to claim 2 which further comprises:
a. a pair of irises, one on each side of the plate of ferroelectric material and each iris having a multiplicity of openings corresponding to the elements of the ferroelectric material; and
b. wherein the plate of ferroelectric material is coarse-grained.

5. A system for adjusting the effective sensitivities of a multiplicity of sensors according to claim 2 which further comprises:
a. a polarizer interposed between the plate of ferroelectric material and the sensor array; and
b. wherein the plate of ferroelectric material is fine-grained.

* * * * *